July 15, 1952  G. H. McDONALD  2,603,471
APPARATUS FOR EXPANDING PERLITE
Filed Aug. 8, 1947  2 SHEETS—SHEET 1

INVENTOR.
GEORGE H. McDONALD
BY Luther L. Mack
Attorney

»
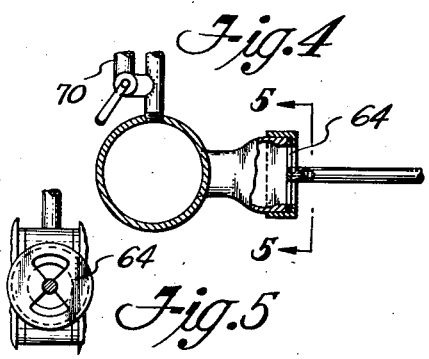
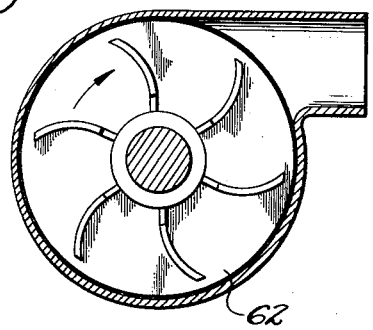
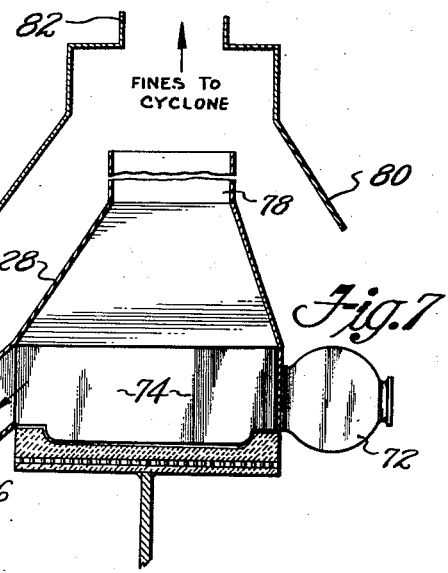
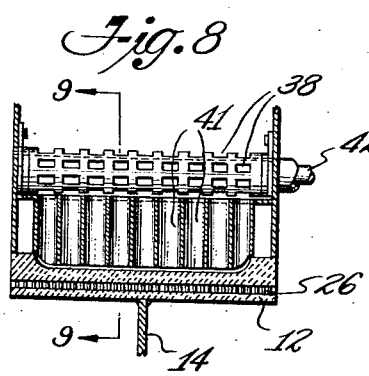
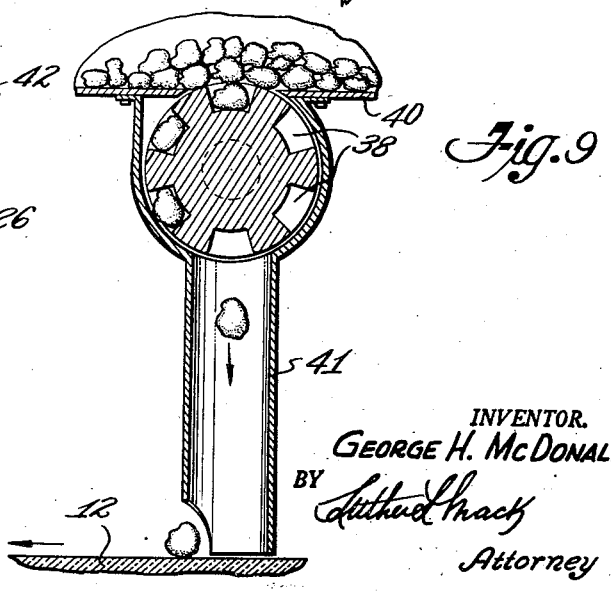

Patented July 15, 1952

2,603,471

UNITED STATES PATENT OFFICE 2,603,471

APPARATUS FOR EXPANDING PERLITE

George H. McDonald, Long Beach, Calif.

Application August 8, 1947, Serial No. 767,452

4 Claims. (Cl. 263—21)

My invention relates to a method of and means for preparing materials from naturally occurring volcanic glasses which when heated under controlled conditions form masses several times the volume of the original material.

The natural mineral generally designated as perlite is an aluminum silicate usually containing less than 8% of combined sodium potassium and calcium oxides, less than 3% iron and other elements, 2.5 to 5% combined water, and the remainder silica plus alumina. Perlite as herein referred to may be defined as a spherulitic obsidian, a silicous volcanic glass, which cooled rapidly from a molten state under such conditions governing incipent crystallization as to form a mass of more or less concentric spheroids.

The raw material, if rapidly heated to between 1500° F. and 1800° F., exfoliates or expands into a tumescent mass of minute cells, each enclosed in an envelope of glassy material, and in this form is a valuable material because of its heat insulation, sound absorbent, fire and chemical resistant, and low moisture absorbent characteristics, and for its value in forming a light weight aggregate with plaster or light weight cement.

The manner in which heating is carried out is critical, since if heating is not uniform the surface of some particles may melt before the interior of the material is sufficiently heated to have assumed the desired cellular structure, while with some particles the steam and gases generated may escape slowly leaving merely a sticky, useless mass. In either event the end product is not a homogeneous tumescent material. By the use of the present invention the end product may be considered a synthetic pumice; both pumice and perlite treated in the manner of the present invention are the same general type of magma subjected to heat and sudden release of pressure. Explosive volcanic eruption in the case of natural pumice and controlled heating with expansion of contained water vapor and gases in the case of processed perlite.

It is an object of my invention to provide a method for heat treating perlite and other ores which ensures that each piece of ore is heated on all sides with a controlled flame bringing it to the proper temperature at a predetermined rate of heating.

It is a further object of the invention to provide a furnace for heating perlite which is provided with overhead gas outlets playing flame downwardly on individual pieces of the ore which are so supported that the flame flows over the ore on all sides, thus thoroughly and evenly heating the pieces of material to a predetermined temperature.

It is a still further object of the invention to provide a method of heat treating perlite and other ores which, in addition to ensuring that the ore is fully treated under controlled conditions provides the treated material free from fines and dust.

Yet another object of the invention is to provide a furnace for inducing intumescence of perlite and similar mineral ores which is capable of continuous operation to secure maximum output.

Another object of the invention is to provide a furnace construction for inducing intumescence of perlite and similar ores in which means are provided for adjusting the conditions of combustion within the furnace by the introduction of a combustible mixture with or without additional medium under controlled conditions, thus enabling ores of different characteristics to be treated with maximum efficiency.

Still another object of the invention is to provide a furnace construction provided with means for supplying sized pieces of ore to the furnace bed in spaced relation and providing means for playing flame around each piece of the ore.

Still further objects and features of the invention will hereinafter appear from the following description of the invention taken in conjunction with the accompanying drawings.

In the drawings:

Fig. 3 is a fragment face view of the control panel for one furnace of the unit;

Fig. 4 is a fragmentary detail in section to an enlarged scale, showing a fuel control valve;

Fig. 5 is a view of the parts shown in Fig. 4 looking in the direction of the arrows 5 in that figure;

Fig. 6 is a section to an enlarged scale on the line 6—6 of Fig. 1;

Fig. 7 is a section on the lines 7—7 of Fig. 2;

Fig. 8 is a section on the line 8—8 of Fig. 2;

Fig. 9 is a section to an enlarged scale on the line 9—9 of Fig. 8.

Figure 1:
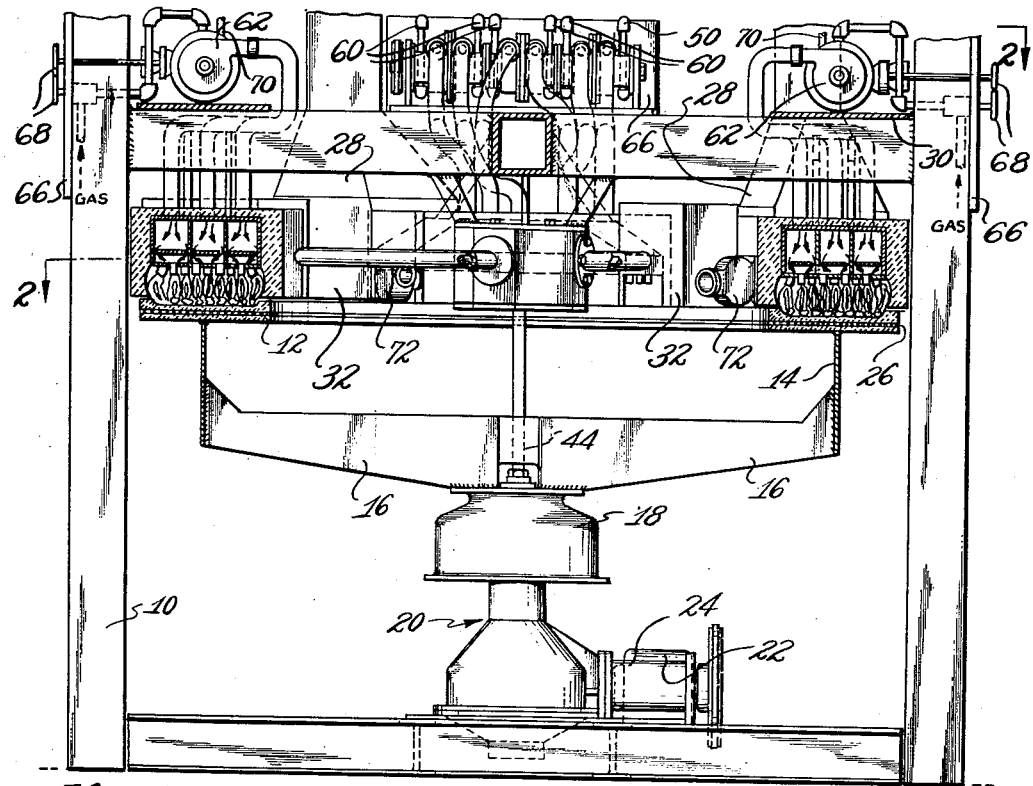
Fig. 1 is a side elevation of a furnace unit with parts shown in section and certain upwardly extending parts broken away to shorten the figure.

In the drawings, the numeral 10 indicates a framework of vertical tubular members arranged in a circle and connected by radial struts both above and below the annular bed 12 of the furnace which is supported on a ring flange 14 which in turn is welded to bearing arms 16 rigidly connected to a bearing structure 18.

The bearing structure is supported on a tubular structure 20 enclosing the drive gears rotating the furnace bed and driven by a motor 22 through reduction gears in housing 24. Obviously, any suitable arrangement of framework and rotary drive for the furnace bed may be utilized and no more detailed description thereof is thought necessary.

The furnace bed 12 may be formed of a flat annulus of refractory material such as fire clay, preferably reinforced by expanded metal or the like indicated at 26.

The furnace bed is covered by a stationary housing 28 secured to an annular plate 30 mounted on the upper radial struts of the frames, the housing having the outline shown in Fig. 7.

In order to secure maximum output, I prefer to arrange a plurality of separate furnace sections 32, four such sections being incorporated in the described embodiment of the invention, but it is to be understood that while this arrangemeit is preferred to me, any other arrangement of the furnace sections may be made, either as a single unit, or series of units and with the units arranged in desired combinations.

Each furnace unit includes a feeding element 34 arranged to receive previously sized material, as shown in Fig. 9, and deposit the material in a series of separate pieces simultaneously upon the furnace bed and spaced from one another. Each feeding element includes a drum 36 having its surface provided with aligned pockets 38. The bottom 40 of the hopper is provided with slots aligned with a row of pockets in the drum, the pieces of material falling through tubular guides 41 onto the furnace bed. The drum is continuously rotated by shaft 42 supported at its outer end in a wall of the housing and at its inner end in a small central housing secured to the upper radial struts and affording an upper bearing to a centrally arranged vertical shaft 44 secured to the rotating supporting frame of the furnace bed. A bevel gear 46 is secured to the upper end of shaft 44 and bevel pinions 48 mounted on the inner end of shafts 42 mesh with gear 46 and cause rotation of drums 36 as bevel gear 46 is rotated by the rotation of the furnace bed support.

Figure 2:
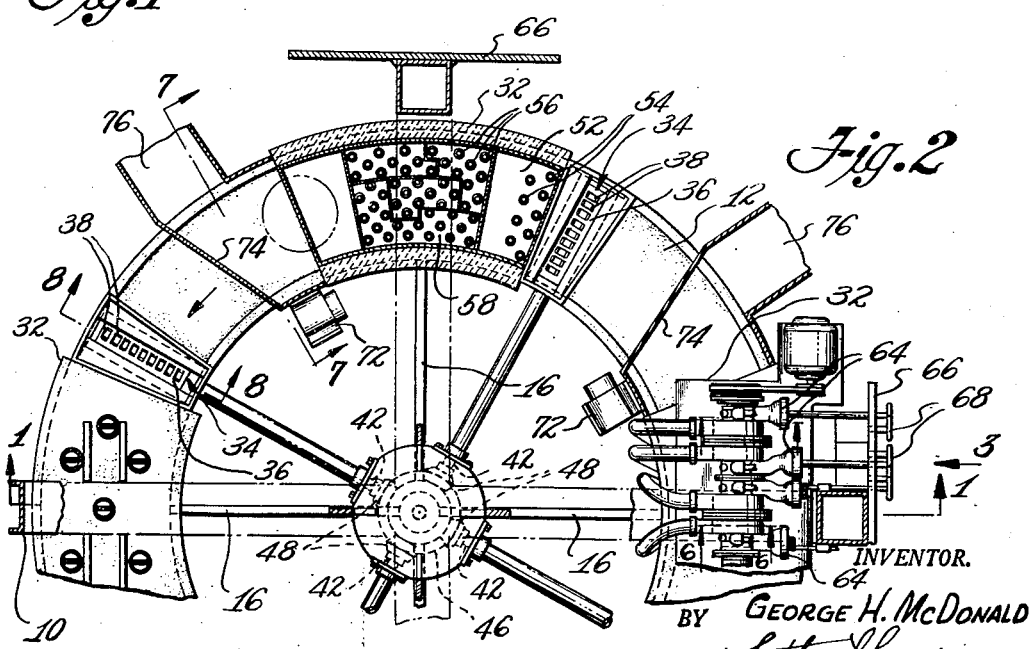
Fig. 2 is a fragmentary plan view of the furnace with parts shown in section.

The furnace bed is rotated in the direction of the arrow in Fig. 2, so that the pieces of the material are next carried under a set of burners arranged in a definite pattern in each furnace unit and playing a hot carefully controlled flame downwardly upon the pieces of material. The first group in each set of burners is supplied through pipe 50 with an air gas mixture which delivers into a manifold chamber 52 provided with a double line of holes 54 extending radially across the chamber 52 adjacent its forward wall, the holes being aligned with the pieces of material positioned on the furnace bed by the chutes or guide tubes 41. The flames extend from each hole from the lower face of the manifold vertically upon the pieces of material and supply a preheat thereto which I have found beneficial in enabling the material to acquire an initial charge of heat and absorb it during passage of the material under the unperforated portion of the bottom of the preheat manifold. It is evident that I may prefer to omit the preheat stage or to add additional heating orifices in place of a restricted number according to the character of the treatment most suitable to a particular type of material, since volcanic glasses vary considerably.

The material next passes under flames projected downwardly from orifices 56 formed in the bottom of manifold chamber 58 supplied by fuel pipes 60. The manifold chamber is preferably provided with both horizontal and vertical walls to effect even distribution of the fuel to all the orifices 56. The gaseous fuel is supplied under pressure by means of a blower 62 associated with each gas pipe, the gas being fed into the blower casing and air introduced into the casing through an adjustable valve 64 of the usual form, as shown in Fig. 5. Both the gas and air feeds are controlled by rods carried to a control panel 66 and fitted with control knobs 68 provided with indicators moving over a scale so that the setting of the valves may be made accurately.

Preferably, I provide conduits 70 tapped into the gas pipes or blower casings and separately controlled whereby additional elements may be supplied to the furnace chambers to control the character of the combustion conditions therein.

The jets of flame playing downwardly on the pieces of material play over the top and sides thereof and cause it to expand in the manner characteristic of the material. Intumescence of perlite particles may be brought about by the application of heat either by an explosive like popping of the particle along or by an exfoliation of the more or less concentric spheroids or by a combination of popping and such exfoliation and in the latter this opening out of the material in one layer after another enables the heat to finally reach the interior of each piece of material. The folding back of the outer layers of the material causes the body of each piece to raise off the bed of the furnace allowing the flame hitting the furnace bed to flow under and heat the undersides of the pieces, and thus the heat of the flame acts on every surface both interior and exterior of each piece. Likewise the intumescence by virtue of popping is insured and carried to completion by the same complete enshroudment of the particle by flame.

The intumescent material is carried by the travel of the furnace bed before blowers 72 arranged adjacent the end wall 74 of the housing and is gently blown out of the furnace through the delivery spouts 76. Any dust or ash lighter than the body of the exfoliated material is blown upwardly and withdrawn through the vertical flues 78 through which a gentle flow of air is maintained by cyclones (not shown).

To ensure that no powerful suction is set up by the cyclones, I prefer to arrange each flue 78 to terminate under a hood 80 spaced from the flue so that air can enter the hood around the open end of the flue and flow into a flue 82 leading to the cyclones, thus inducing a flow through flues 78.

By the furnace arrangement described and the control of the heating flames applied to the material and the manner in which the material is subjected thereto, I am enabled to fully exfoliate perlite and similar material in an economical manner, and to process such ores successfully even when varying considerably in characteristics.

It is pointed out that mechanical means may be utilized to remove the expanded product from the furnace if deemed preferable, or a combination of both air and mechanical means.

It will be noted that since the flames in the furnace impinge against the furnace bed resulting in mushrooming of the flames over the bed, the spaced pieces of ore as they are carried under the spaced burners are acted upon by the flames on all sides, as well as the upper surfaces. As the pieces raise from the bed by the unfolding of the bottom edges of the pieces, or by the popping of the particle the flames penetrate under the material, this flame action causing a complete intumescence of the material.

While I have described a preferred manner of carrying out my process and suitable apparatus therefor, it is to be understood that various changes and modifications of both the described process and apparatus may be effected by those skilled in the art without departing from the scope of the invention as intended to be defined by the appended claims.

I claim:

1. In a furnace for effecting intumescence of perlite and other ores having similar characteristics said furnace having an annular imperforate and rotatable furnace bed and a housing extending over said bed, means to position a plurality of pieces of material simultaneously and in spacer relation to one another on said furnace bed comprising: a drum-like member having a series of spaced pockets formed in its periphery and adapted to receive pieces of ore of substantially the same size; means effective to rotate the drum; tubular guides into which the pieces of ore carried by the drum-like member are delivered by the rotation of the said member and effective to guide the pieces of ore into position in spaced relation upon the furnace bed, and means to direct a flame downwardly upon and around each piece of the ore and upon the furnace bed and by lateral spreading of the flame on the furnace bed and raising of each piece of ore on its out folded outer layers, under the pieces of ore.

2. A furnace as set forth in claim 1 and comprising a manifold for gaseous fuel arranged within the housing and above the furnace bed, a plurality of orifices being provided in the lower face of said manifold to direct the flame downwardly upon the furnace bed and pieces of ore thereon.

3. A furnace as set forth in claim 1 and comprising a manifold for gaseous fuel arranged within the housing and above the furnace bed, a plurality of orifices being provided in the lower face of said manifold to direct the flame downwardly upon the furnace bed and pieces of ore thereon, a group of said orifices being arranged spaced from the remainder thereof to effect preheating of the ore at the commencement of its travel through the furnace.

4. In a furnace for effecting intumescence of perlite and other ores having similar characteristics said furnace having an annular imperforate and rotatable furnace bed and a housing extending over said bed, means to position a plurality of pieces of material simultaneously and in spaced relation of one another on said furnace bed comprising: a movable member having a series of spaced recesses therein; a hopper having the bottom thereof apertured in alignment with the series of recesses in said movable member; and a series of guiding chutes having upper openings aligned with the spaced recesses in the movable member and delivering pieces of ore onto the furnace bed in spaced relation; means to move said movable member to bring the aligned recesses therein into position to receive pieces of ore from the hopper and to position the filled recesses over the upper ends of the guiding chutes for delivery of pieces of ore thereinto; and means to direct a flame downwardly upon and around each piece of the ore and upon the furnace bed and by lateral spreading of the flame on the furnace bed and raising of each piece of ore on its out folded outer layers, under the pieces of ore.

GEORGE H. McDONALD.

REFERENCES CITED

The following references are of record in the file of this patent:

UNITED STATES PATENTS

| Number | Name | Date |
|---|---|---|
| 718,257 | Keyes | Jan. 13, 1903 |
| 916,393 | Dwight et al. | Mar. 23, 1909 |
| 951,198 | Perkins et al. | Mar. 8, 1910 |
| 969,927 | Wilfley | Sept. 13, 1910 |
| 1,075,011 | Christensen | Oct. 7, 1913 |
| 1,206,397 | Yost et al. | Nov. 28, 1916 |
| 1,436,520 | Oliver | Nov. 21, 1922 |
| 1,455,975 | Spencer | May 22, 1923 |
| 1,634,027 | Honigmann et al. | June 28, 1927 |
| 1,666,656 | Honigmann | Apr. 17, 1928 |
| 1,763,453 | Bartling | June 10, 1930 |
| 1,904,128 | Fuller | Apr. 18, 1933 |
| 1,963,275 | Labus | June 19, 1934 |
| 1,963,276 | Miner et al. | June 19, 1934 |
| 1,992,669 | Labus | Feb. 26, 1935 |
| 2,029,524 | Denning | Feb. 4, 1936 |
| 2,151,083 | Christensen et al. | Mar. 21, 1939 |
| 2,174,066 | Ahlmann | Sept. 26, 1939 |
| 2,265,358 | Denning | Feb. 9, 1941 |
| 2,293,549 | Keener | Aug. 18, 1942 |
| 2,379,418 | Cover | July 3, 1945 |
| 2,403,433 | Gelbman | July 9, 1946 |
| 2,424,330 | Robertson | July 22, 1947 |
| 2,430,601 | Cleary | Nov. 11, 1947 |
| 2,456,207 | McCoy | Dec. 14, 1948 |
| 2,501,962 | Pierce | Mar. 28, 1950 |